United States Patent [19]

Chartrand

[11] Patent Number: 4,953,110
[45] Date of Patent: Aug. 28, 1990

[54] TURBOCHARGER CONTROL SYSTEM

[75] Inventor: Paul W. Chartrand, Reno, Nev.

[73] Assignee: Globe Turbocharger Specialties, Inc., Reno, Nev.

[21] Appl. No.: 203,663

[22] Filed: Jun. 7, 1988

[51] Int. Cl.[5] ............... F02B 37/14; G08B 23/00; G01M 15/00

[52] U.S. Cl. .................... 364/550; 60/602; 340/441; 364/431.03

[58] Field of Search .......... 364/431.03, 550, 551; 340/52 R, 52 F; 60/608, 602

[56] References Cited

U.S. PATENT DOCUMENTS

| | | | |
|---|---|---|---|
| 3,869,866 | 3/1975 | Timoney | 60/608 |
| 4,083,188 | 4/1978 | Kumn | 60/608 |
| 4,380,893 | 4/1983 | Stokes et al. | 364/431.02 |
| 4,630,043 | 12/1986 | Haubner et al. | 340/52 F |
| 4,679,398 | 6/1987 | Nishiguchi et al. | 60/602 |
| 4,680,933 | 7/1987 | Bozung et al. | 60/608 |
| 4,683,542 | 7/1987 | Taniguti | 364/508 |
| 4,745,755 | 5/1988 | Kawanuwa | 60/608 |
| 4,756,377 | 7/1988 | Kawanuwa et al. | 60/608 |
| 4,758,964 | 7/1988 | Bittner et al. | 364/508 |
| 4,774,811 | 10/1988 | Kawanuwa | 60/608 |
| 4,775,947 | 10/1988 | Marron | 364/550 |
| 4,787,053 | 11/1988 | Moore | 364/550 |
| 4,797,663 | 1/1989 | Rios | 364/550 |

Primary Examiner—Felix D. Gruber
Attorney, Agent, or Firm—Townsend and Townsend

[57] ABSTRACT

A system for monitoring various operating conditions of a turbocharger for providing warnings and control when the monitored operating conditions meet and/or exceed predetermined limits.

31 Claims, 4 Drawing Sheets

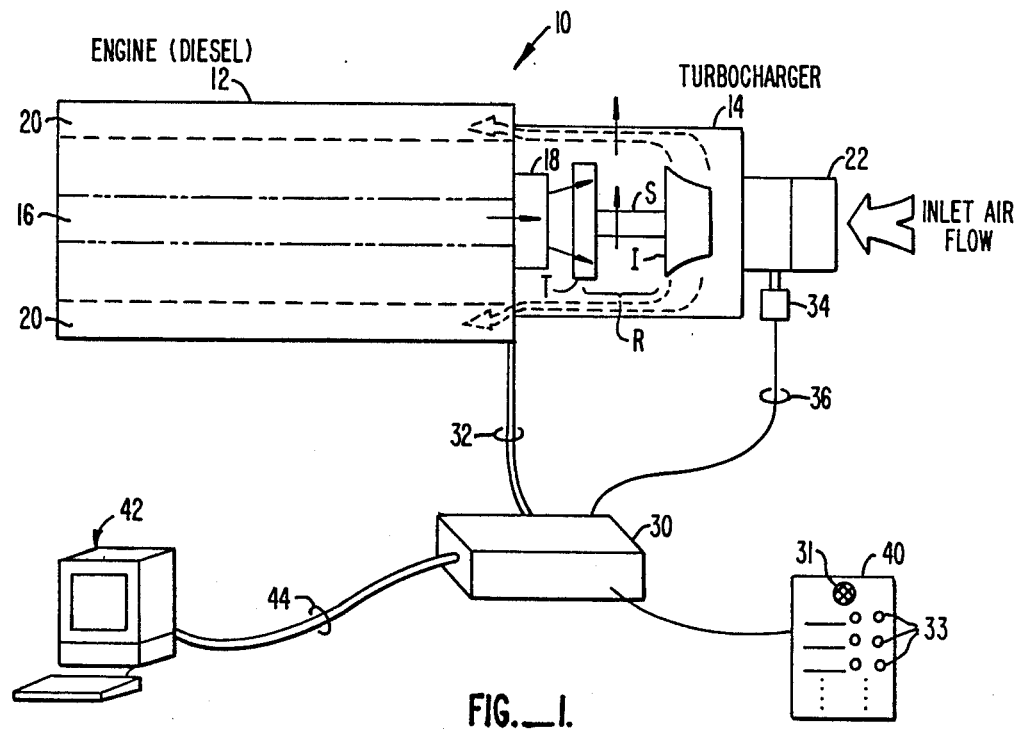
FIG._1.
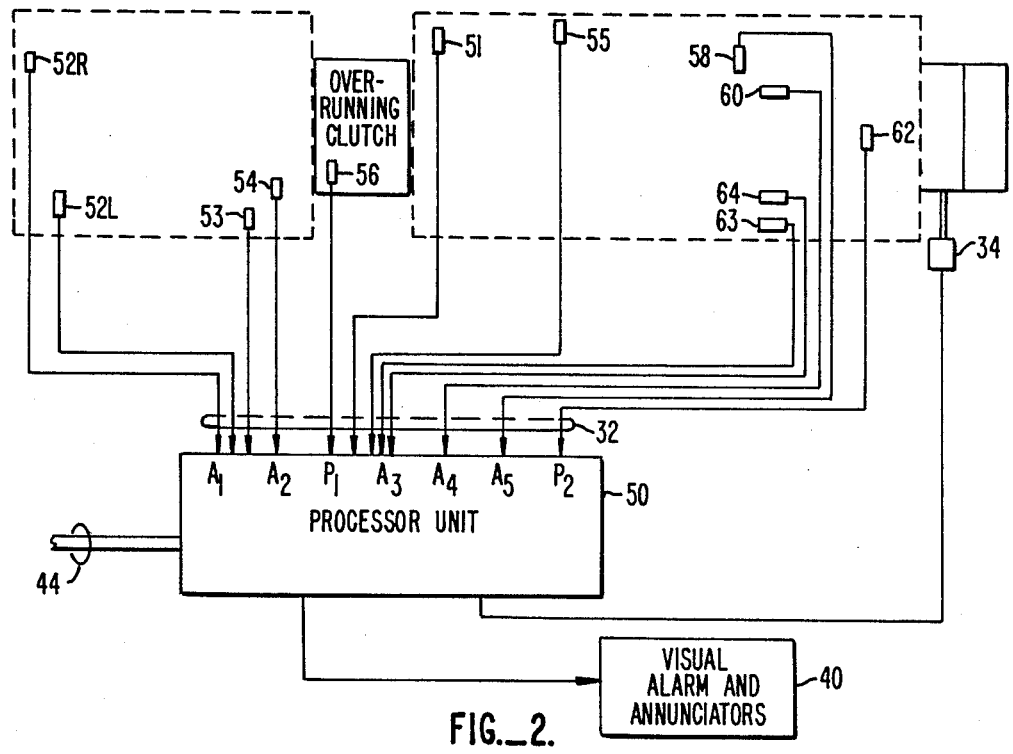
FIG._2.

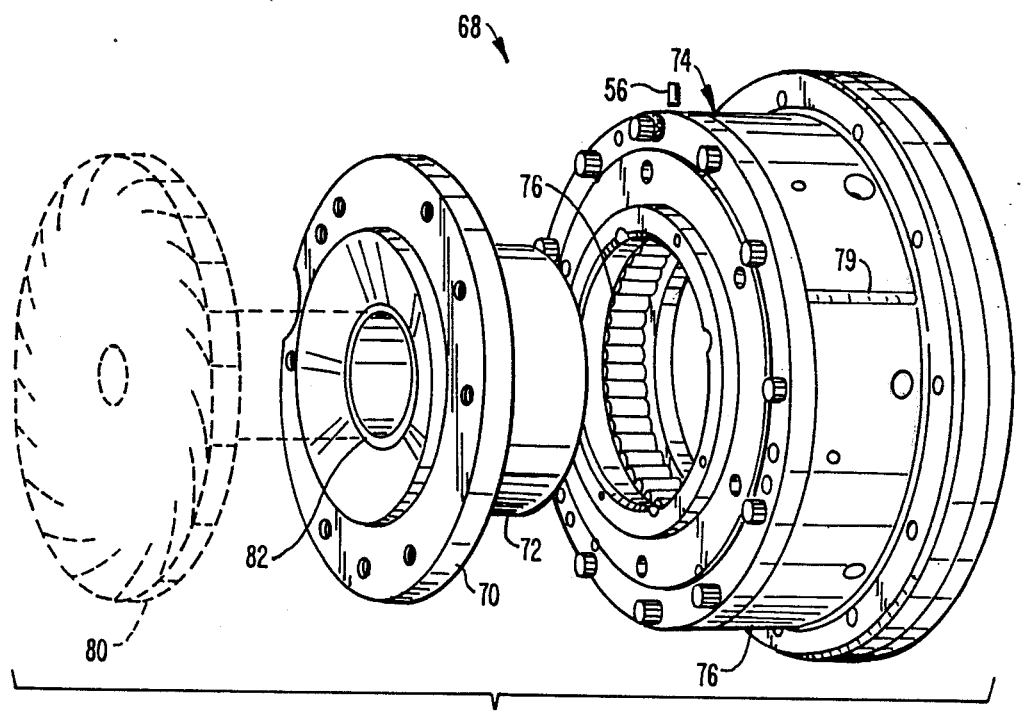
FIG._3.
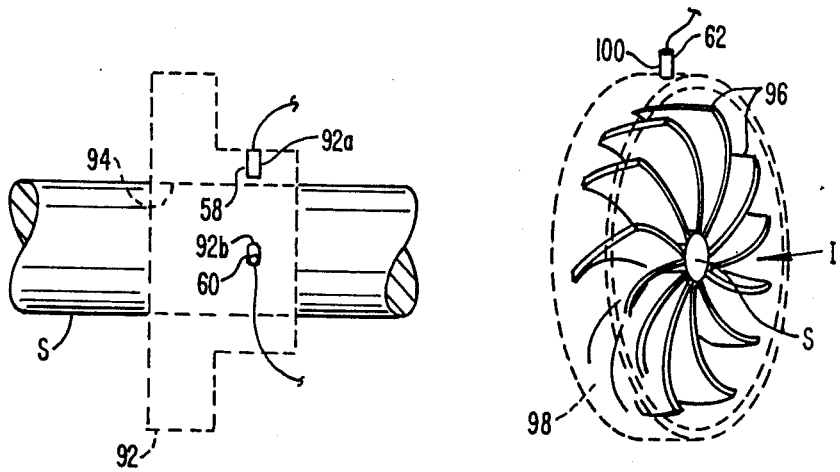
FIG._4.
FIG._5.

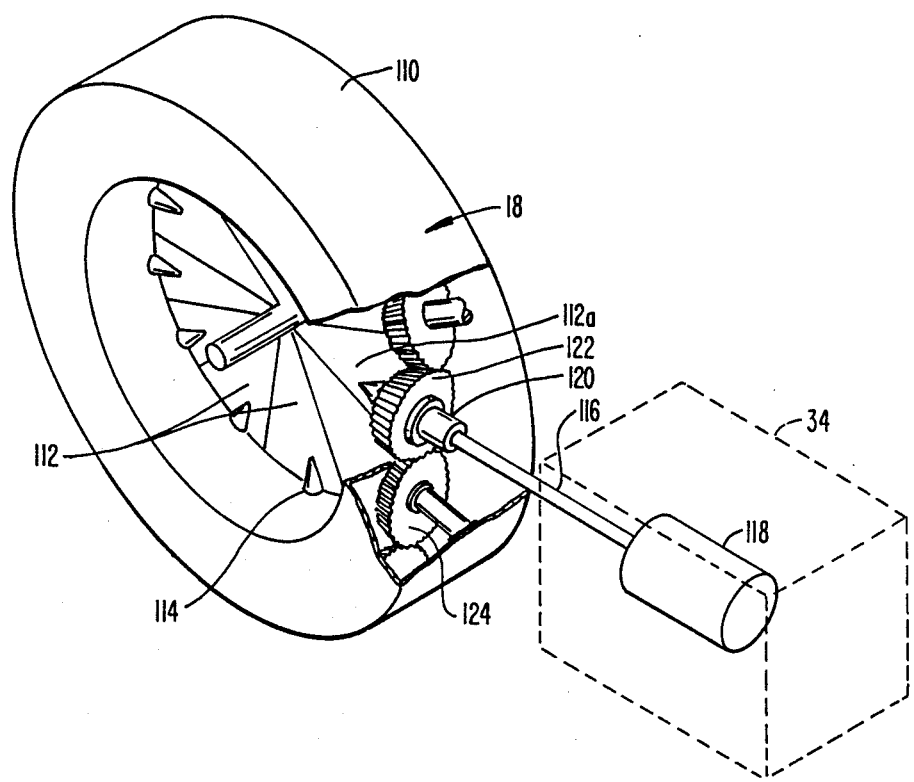
FIG._6.

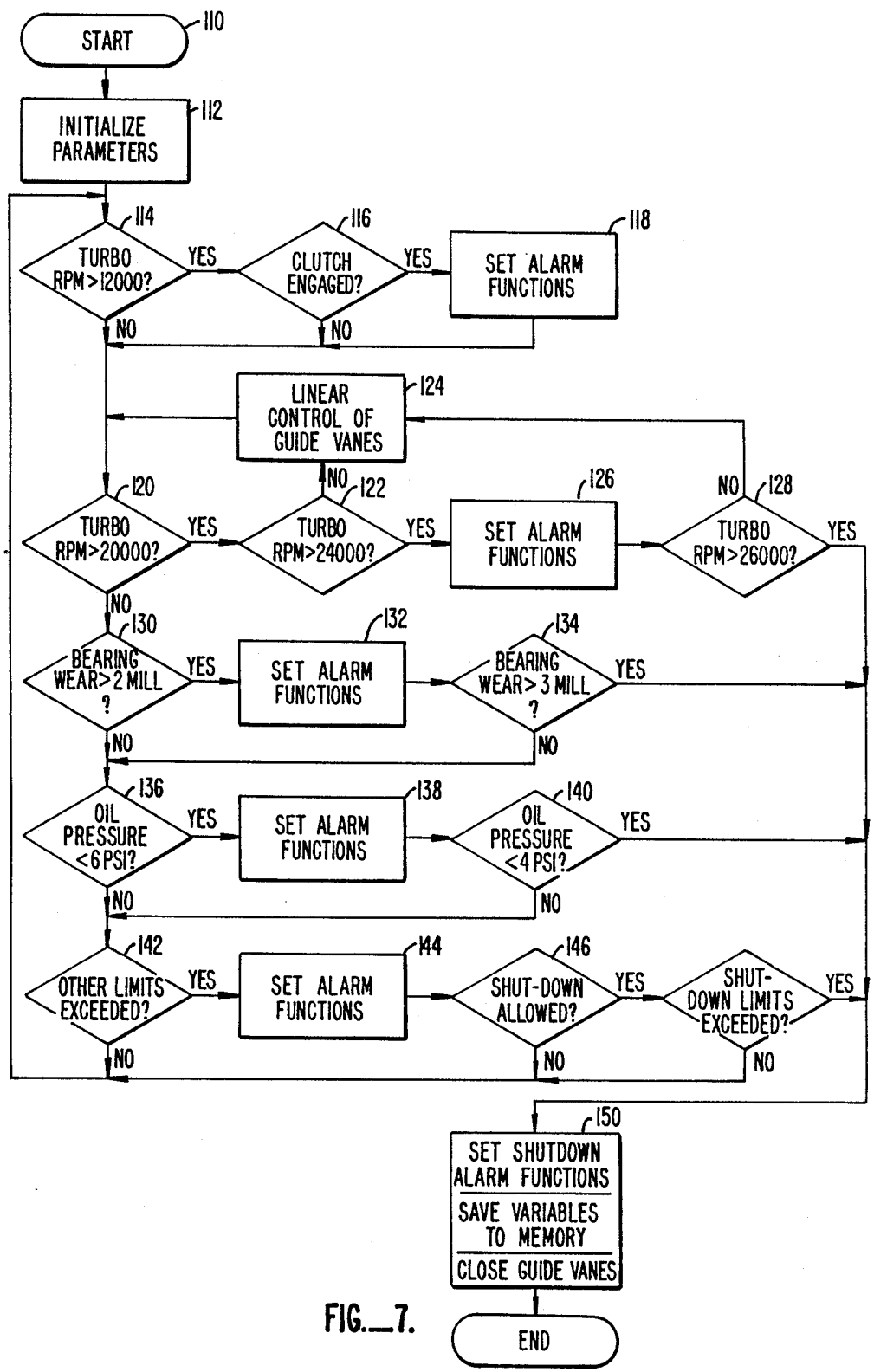
FIG._7.

TURBOCHARGER CONTROL SYSTEM

BACKGROUND OF THE INVENTION

The present invention relates generally to diesel engine systems of the type that incorporate a turbocharger to supply compressed air to a diesel engine, and more particularly to apparatus for monitoring certain of the more critical operating parameters of the system and for effecting control over the system in the event the monitored operating parameters exceed certain predetermined operating limits.

In large-bore, high-horsepower diesel engines of the type to which the present invention is directed, the greater amount of fuel required to operate the engine necessitates a proportionately greater amount of combustion air in order to burn the fuel. Thus, in larger diesel engines where high horsepower is demanded, some form of air supply is needed. This need is met by the utilization of a turbocharger that operates to pump the additional air for the engine, and thereby increase substantially the engine's efficiency and horsepower. In diesel engine systems today, the turbocharger is designed to operate from the exhaust gases produced by the diesel engines. The turbocharger is constructed with an exhaust-driven turbine connected to an air impeller that functions to produce the supply of combustion air for the engine.

In two-cycle engines, exhaust-driven turbochargers lose their efficiency at intermediate to low speeds, necessitating an assist from the engine through a gear train. Thus, at initial (i.e., start-up) speeds, the engine directly drives the impeller to develop the supply of combustion air. As engine RPM increases, the energy contained in the exhaust gases of the engine also increases, and a point is reached whereby the engine's exhaust gas energy is capable of driving the turbine/impeller combination at a speed that will provide adequate combustion air, and without the gear-driven assistance of the engine. At this point, the engine is decoupled from the impeller by an overriding clutch, and the impeller allowed to overrun.

While such large-bore diesel engine systems as described achieve extremely high horsepower ratings, the systems are prone to certain failures. One of the principal sources of failure is overspeed of the rotor assembly; that is, the turbine/impeller combination is rotated at revolutions per minute (RPM), higher than that at which the turbocharger is designed. Turbocharger overspeeding can be caused by a number of factors, including fires in the exhaust manifolds of the diesel engine, creating additional energy that will overspeed the turbocharger. Further, failure of the overriding clutch (in two-cycle engines) to properly disengage will damage the turbocharger if permitted to go undetected.

If these conditions are left to exist for too long a period, the turbocharger will ultimately destroy itself.

Further, diesel engine systems are often designed as a unit; that is, the turbocharger is designed to meet the specific rated horsepower requirements of the diesel engine. Often, unfortunately, after the engine and turbocharger have been so designed and put in use, the engine is reworked to increase its horsepower rating by various modifications, such as increasing the engine bore, increasing piston stroke, increasing the compression ratio, or other known modifications. Thus, the diesel engine horsepower rating may be increased beyond original specifications by these modifications by as much as 50% to 75%; yet a turbocharger that is designed for a lower horsepower rating is often still being used with the higher horsepower engine. It is when this happens that the overspeed situations can become more prevalent.

In addition to failures caused by overspeeding the turbocharger, other failures that cause near-total, if not total, destruction of the turbocharger include bearing wear that, if undetected, will reach a point permitting the turbocharger to literally tear itself apart at the high RPM of normal operation; loss of oil pressure; and similar malfunctions.

Thus there is a need for a system capable of monitoring the turbocharger and large-bore diesel engine assembly to detect when certain operating parameters, such as the temperature of the exhaust gases, failure of the overriding clutch to release at its release point, oil pressure, movement of the shaft carrying the turbine and compressor, and the like to ensure that the turbocharger does not exceed certain predefined limits and, if it does, to control the system to avoid destruction.

SUMMARY OF THE INVENTION

The present invention provides apparatus for monitoring certain operating parameters of a diesel engine system comprising a diesel engine and turbocharger, and to control of the system when monitored operating parameters indicate that a critical, systemthreatening limit is reached. In the event the apparatus of the present invention is unable to achieve control, it will operate to shut the system down, preventing it from destroying itself.

Broadly, the invention includes a plurality of sensors mounted to monitor the following parameters:

1. The pressure of the intake air to the diesel engine:
2. The temperature of the exhaust gases produced by the diesel engine;
3. The rotational speed (RPM) of the turbine/impeller combination;
4. Engagement-disengagement of the overriding clutch assembly;
5. Bearing wear in the turbocharger by sensing bearing clearance:
6. Rotor shaft vibration; and
7. Oil pressure of the turbocharger.

A processor unit continually reads the values produced by each of the above sensors, and compares them to predetermined limits. For example, in two-cycle engines the rotational speed of the turbine/compressor assembly is monitored to ensure that it does not exceed a predetermined RPM. In two and four-cycle engines, the rotational speed is monitored to ensure the turbine/impeller combination is not overspeed.

In those cases (such as excessive pressure of intake air to the diesel engine, or overheating of the exhaust gases from the diesel engine), which can cause the turbocharger to overspeed, the invention will sound an alarm and control the RPM of the turbocharger. For this purpose, the air inlet of the turbocharger is provided with controllable guide vanes capable of selectively inhibiting the amount of air brought in by the impeller of the turbocharger. Should the monitored RPM continue to increase, indicating that control of the system is ineffective, the processor can adjust the vanes to completely close the air inlet of the turbocharger, terminating its ability to supply air to the diesel engine system. Starved of its supply of combustion air, the diesel engine will cease to operate, and serious destruction is avoided.

When a monitored operating parameter of the diesel engine system (i.e., the diesel engine and the turbocharger) reaches a first predetermined limit, the processor operates to perform three tasks: First, it will actuate an alarm — either visual, aural, or both; next, it will read all sensors and store the readings, with time and date stamps, for later analysis to allow determination of the cause of the alarm; and third, it will initiate control of the system (by adjusting the guide vanes) to bring the monitored operating parameter into safe operating range. While control is attempted, the monitoring process continues, and if the monitored operating parameter continues unabated, the processor will terminate system operation by shutting the guide vanes, and eliminating the turbocharger's ability to supply combustion air. Robbed of its source of air, the diesel engine ceases operation.

These and other aspects and advantages of the invention will become evident to one skilled in this art upon a reading of the following detailed description of the invention, which should be taken in conjunction with the accompanying drawings.

BRIEF DESCRIPTION OF THE DRAWINGS

FIG. 1 is a diagrammatic illustration of a diesel engine system, using representative block diagram representations to describe the diesel engine, the turbocharger, and the monitoring apparatus of the present invention;

FIG. 2 is a block diagram of the monitoring apparatus of the present invention, illustrating the various sensors and their connection to the processing element of the invention;

FIG. 3 is a representation of the clutch probe sensor used to monitor disengagement of the overriding clutch of the turbocharger for two-cycle engine systems;

FIG. 4 is a representation of the use of proximity sensors to monitor shaft vibration and bearing gap action of the shaft that carries the turbine/impeller (rotor assembly) of the turbocharger;

FIG. 5 illustrates the use of a proximity sensor to sense the blades of the compressor to provide an indication of the rotational speed of the rotor assembly;

FIG. 6 is an illustration of the adjustable guide vanes situated at the air intake of the turbocharger;

FIG. 7 is a flow chart illustrating operation of the invention.

DETAILED DESCRIPTION OF THE INVENTION

Referring now to the drawings, and for the present with specific reference to FIG. 1, there is illustrated in diagrammatic, representative form a diesel engine system, designated generally with the reference numeral 10. As shown, the diesel engine system 10 comprises a diesel engine 12 coupled to a turbocharger 14 of the type having a rotor assembly (R) comprising generally a shaft (S) carrying an exhaust drive turbine (T) which, in turn, drives a bladed impeller (I). The diesel engine 12 and turbocharger 14 are of conventional design and construction, except for the addition of the sensors used in connection with the present invention, which will be more fully described.

The diesel engine 12, which can be either a two-cycle or four-cycle diesel engine, is connected to the turbocharger so that the exhaust gases produced by the diesel engine 12 are communicated from an exhaust manifold 16 through an exhaust input 18 of the turbocharger 14 to drive the turbine (T) of the turbocharger 14.

Operation of the diesel engine 10 is generally as follows: An air flow is generated by the rotation of impeller I, which sucks air through an air filter 22 compresses it, and pumps the air to the intake manifold 20, thereby supplying a pressurized source of combustion air for the diesel engine 12. The motive force for the impeller I is supplied by exhaust gases from the diesel engine 12. The exhaust gases are communicated from the exhaust manifold 16, through the exhaust input 18 of the turbocharger 14, and used to drive (rotate) the turbine T. The turbine T, in turn, via the shaft S, drives the impeller I.

As FIG. 1 further illustrates, the present invention provides a monitor and control unit 30 that is connected to various sensors mounted in the diesel system 10 by a sensor bus 32, and to a vane control unit 34 by electrical wiring 36. The monitor and control unit 30 also connects to an alarm unit 40, via appropriate wiring, carrying an audio alarm 31 and warning lights 33. The monitor and control unit 30 also connects to a data and programming source, such as a personal computer system 42 via a data bus 44.

In general, the monitor and control system of the present invention operates, in conjunction with a diesel system 10, along the following lines: Various sensors are mounted in the system 10. For example, a temperature sensor is mounted in the diesel exhaust manifold 16 to monitor the temperature of the exhaust gases produced by the diesel engine 12. In two-cycle engines, requiring low-speed assist from the diesel engine 12, a sensor is mounted to determine rotation of a catch ring of the overriding clutch used in the turbocharger, as will be more particularly described. Other sensors are mounted in the turbocharger (as described more fully below) to monitor the rotational speed of the rotor assembly R, as well as the movement of the shaft S carrying the turbine T and impeller I.

The monitor and control unit 30 operates to sequentially sample the various sensors placed or otherwise mounted in the diesel engine system 10 (i.e., the engine 12 and the turbocharger 14). The data obtained from the sampling process is, at each sample time, compared to predetermined limit values. If the sample is within a safe operating range (as determined by the limit for that sample), no action is taken. However, should the sample be found to equal or exceed the limit, indicating an unsafe operating condition, a warning is issued and a control procedure is initiated. For example, if the temperature of the exhaust gases in the exhaust manifold 16 of the diesel engine 12 reaches or exceeds a temperature limit set for that parameter, or the turbocharger RPM is excessive, the monitor and control unit will announce that a predetermined temperature or RPM limit has been reached (or exceeded) by (1) activating the warning light 33 associated with temperature or RPM and actuation of the audio alarm 31. In addition, the monitor and control unit 30 will initiate a control function. For this purpose, the air intake, on the downstream side of the air filter 22, is provided with adjustable guide vanes (FIG. 6) that are controlled by the vane control unit 34 as will be described more fully below. To effect control, therefore, the monitor and control unit 30 will signal the vane control unit via signal lines 36 to cause the vane control unit 34 to rotate adjustable guide vanes (FIG. 6) from their normally full-open position toward a closed position. During the time of the control function the monitor will send a signal to the fuel regulating valve with instructions to back the engine throttle back to correspond with the amount of air that is being supplied to the engine, due to the fact that the guide vanes are closing off the amount of air available to the air pump. The monitor and control system 30 continues control, rotating the guide vanes in incremental steps until the operation of the system is brought within a safe range. If control cannot be established, such as, for example, when the exhaust temperature continues to climb (as it may if there is a fire in the exhaust manifold 16), reaching a second and higher, critical level, the monitor and control unit 30 will command the vane control unit 34 to rotate the guide vanes to their fully closed positions to terminate air flow through the inlet port to the turbocharger 14, thereby starving the turbocharger 14 of its source of air, and in turn terminating the combustion air for the diesel engine 12. The turbocharger 14 is no longer able to produce a source of compressed air for the diesel engine 12, and the diesel engine will subsequently (and relatively quickly) shut down.

The above general example of the operation of the present invention concentrated on monitoring the exhaust gases produced by the diesel engine 12. As will be seen, however, other system parameters are also monitored so that a fault-tolerant monitoring is provided, For example, although one indication of an overspeed condition, or an approaching overspeed condition, can be seen in a rise in the temperature of the exhaust gases of the diesel engine 12, overspeed will also manifest itself in a rise in the pressure supplied to the diesel engine. This too is monitored, providing a backup to the temperature monitor. Other backups, as will be seen below, are also provided.

With this general description of the present invention and its operation in mind, a more detailed discussion of how the invention is constructed and implemented can now be better understood. Referring, therefore, to FIG. 2, there is shown a representation of the various sensors preferred in monitoring a diesel system 10, together with the heart of the monitor and control unit in the form of a processor unit 50. In the preferred embodiment of the invention, the processor unit 50 connects to the following sensors:

1. A temperature sensor 51 is located in the turbocharger 14 to monitor the temperature of the air pumped to the engine 12 by the turbocharger.
2. Pressure sensors 52R and 52L are respectively mounted in the intake manifold 20 (FIG. 1) of the diesel engine 12 to monitor the pressure of the compressed air produced by the turbocharger 14.
3. A pressure sensor 53 is mounted in the exhaust manifold 16 (FIG. 1) to monitor the back pressure generated therein.
4. A temperature sensor 54 is also mounted in the exhaust manifold 16 to ensure that the energy of the exhaust gases produced by the diesel engine 12 do not exceed a predetermined limit, protecting the turbocharger from overspeed conditions.
5. The spent exhaust gases emitted by the turbocharger 14 are monitored by a temperature sensor 55.
6. In the event the diesel engine 12 is a two-cycle engine, requiring a mechanical assist for the turbocharger, a clutch probe 56 is mounted in conjunction with the overriding clutch typically used in such diesel systems. As will be seen, the clutch probe senses rotation of a clutch ring, which occurs when the overriding clutch disengages the drive train between the turbocharger 14 and the diesel engine 12. Movement of the ring indicates disengagement, while non-movement indicates no disengagement.
7. Two bearing probes 58 and 60 are provided to monitor bearing gap and rotor shaft S movement.
8. To monitor the rotational velocity (RPM) of the turbocharger (i.e., the rotor assembly R) there is provided an impeller probe 62 which operates to detect rotation of the impeller blades.
9. A soak back pump sensor 63 is provided.
10. Finally, the oil pressure of the turbocharger is monitored by an oil pressure sensor 64.

The processor unit 50 operates to cyclically read each sensor, and compare each reading to predetermined limits, as described generally above. If limits are reached or exceeded, the alarm unit 31 (i.e., warning lights 33 and the audio alarm unit 40, respectively) are actuated. The processor unit 50 will also initiate a control function, via the vane control unit 34 and the adjustable guide vanes (FIG. 6), mounted in the inlet port 18 of the turbocharger 14 (FIG. 1) to bring operation of the system 10 back to within safe operating limits.

The processor 50 is of conventional design in that it will comprise a microprocessor system that includes sufficient memory to storage of the software needed to guide its operation. In particular, the processor 50 is configured to provide access via the I/O bus 44 to an external processor system, such as the personal computer system 42. This permits the operating software of the processor 50 to be checked and/or modified from time to time. In addition, as will be described in greater detail below, when one or more of the operating limits is determined to have been equaled or exceeded, all the sensors are read, and each reading is stored with a time and date stamp, indicating the time of the reading (and thereby the time of limit or limits were exceeded). Access to this information may be had via the I/O bus 44.

The processor unit 50 is provided with a plurality of analog channels A for receiving the analog signals produced by pressure sensors 52 and 53, the temperature sensors 51, 54 and 55, the bearing probes 58 and 60, and the oil pressure probe 64. In addition, pulse counting channels $P_1$ and $P_2$ are provided for respectively receiving pulses produced by the clutch probe 56 and impeller probe 62. The processor unit 50 operates to scan and process the channels, according to programmed control of a microprocessor (not shown) included in the processor unit 50.

As indicated above, the clutch probe 56 is used only on two-cycle engines; four-cycle diesel engines are capable of developing their own supply of combustion air at lower speeds without turbocharger assistance. Two-cycle diesel engines, therefore, are connected to exhaust-driven turbochargers through a series of gears and an overriding clutch assembly to drive the turbine T until an engine RPM having sufficient exhaust gas energy to drive the turbine (T) is achieved. When this engine RPM is achieved (usually 650–675 RPM - depending upon the condition of the engine), the clutch will overrun, allowing a ring gear to rotate. It is this ring rotation that is sensed by clutch probe 56 to signal disengagement (continued engagement) of the clutch assembly.

FIG. 3 illustrates, in simplified form, an overriding clutch assembly. As shown, a clutch support member 70 is adapted to be mounted to the housing of the turbocharger 14 (FIG. 1) in fixed position. The clutch support member 70 provides a cylindrical extension 72 that carries the clutch assembly 74. The clutch assembly 74 includes a sprag assembly 76 that is adapted to ride on the cylindrical extension 72. The sprag assembly contains a number of sprag elements that are loosely held in a cage, and function as wedging struts between the surface of the cylindrical extension 72 and the clutch assembly 74.

At low speeds, during which the exhaust gases produced by the diesel engine 12 are insufficient to rotate the turbine 80 (illustrated in phantom), the diesel engine 12 will impose a rotational, driving force through a gear assembly (not shown) that connects to the clutch assembly 74. The rotational force imposed upon the clutch assembly 74 will exceed that imposed upon the turbine 80 by the exhaust gases, causing the sprag assembly 76 to "wedge" between the clutch assembly 74 and the clutch support 70, holding them fixed to one another. This wedging action locks the clutch assembly 74, preventing it from rotating, and allowing an engine-driven gear arrangement to rotate and drive a sun gear (not shown) located on a terminal end of the turbine shaft 82.

When the energy of the exhaust gases reaches a point sufficient to drive the turbine 80 without help from the diesel engine 12, the torque at the gear arrangement (not shown) will reverse direction, causing the sprag elements 76 to release from their wedging position, and unlocking the clutch assembly 74 from the clutch support 72, permitting it to overrun. The clutch ring 76 now rotates. This rotation is sensed by forming a notch 79 in the outer surface 78 of the clutch ring 76. As the clutch ring rotates, the movement of the notch 79 is sensed by the clutch probe 56 as it passes thereunder with the rotation of the clutch ring 76.

Turning now to FIG. 4, the technique used to monitor bearing gap of the shaft (S) of the rotor assembly R is illustrated. The shaft S is typically held by a bearing assembly 92 of known construction. Bearing assembly 92 is modified to incorporate the vertical and horizontal bearing probes 58, 60, respectively. For this purpose, openings 92a, 92b are formed in the bearing assembly, approximately 90 degrees from one another (the opening 92a being generally vertically oriented, the opening 92b being horizontally oriented) for accepting the bearing probes 58, 60, respectively. The bearing probes 58, 60, which as mentioned above are proximity sensors, are respectively inserted in the openings 92a, 92b, so that the interior ends of the bearing probes are either flush or slightly recessed from the interior bearing surface 94 of the bearing assembly 92. In this manner, the bearing probe 58 senses the vertical displacement of the shaft 82a, while the bearing probe 60 senses the horizontal displacement. In this manner, the vertical and horizontal bearing gaps (more accurately, the gap between the probe and the shaft, normalized to the interior bearing surface of the bearing assembly 92) are separately monitored dynamically, and the information combined to measure the "orbit" of the shaft 82a. (Orbit, as used herein, is the elliptical-like movement of the shaft S.) The information provided by the bearing probes 58, 60 provides a measure of the wear of the bearing. If that wear exceeds a predetermined limit, a warning is provided so that the turbocharger can be serviced before it destroys itself.

Note that in the event one of the bearing probes 58, 60 fails, the other can still be used, albeit the orbit can no longer be determined. If, during operation, the shaft 90 is sensed as moving within certain limits, no warning is given. However, if the movement of the shaft 90 (either in the vertical or horizontal directions) is beyond predetermined limits, warnings are given.

Turning now to FIG. 5, there is illustrated a representation of the impeller I of the turbocharger 14 (FIG. 1). As shown, the impeller I is formed from a number of impeller blades 96 mounted to the shaft S, and circumscribed by an impeller housing 98. An opening 100 is formed through the impeller housing 98 to receive the proximity sensor that forms the impeller probe 62. The impeller probe provides a pulse for each passing impeller blade that is communicated to the processor unit 50 (FIG. 2). The processor unit 50 counts the pulses on a per-minute basis, and divides that number by the number of impeller blades to produce a value indicative of the revolutions per minute (RPM) of the turbine/compressor combination.

The RPM value is used not only to ensure that the compressor is not subjected to overspeeding conditions, but also in conjunction with the clutch probe 56 in the following manner: When the monitored RPM of the turbocharger turbine/compressor reaches a certain predetermined limit (e.g., 12,000 RPM), at which the clutch should disengage, the processor 50 begins to look at the information provided by the clutch probe 56. If the clutch probe 56 is sensing rotation of the clutch ring 76, there is no problem. If, however, the rotational velocity of the turbine/compressor is indicated as being equal to or greater than 12,000 RPM with no concomitant indication of rotation of the clutch ring 76, a warning is sounded to indicate that the clutch is still engaged when it should be disengaged.

Turning now to FIG. 6, the control mechanism of the present invention is illustrated. As shown, the entry port 18 of the turbocharger 14 (FIG. 1) is formed, in part, by a collar 110. Pivotally mounted, and radially extending inward, of the collar 110 are triangularly shaped throttling vanes 112. Each throttling vane 112 is mounted on a pivot shaft 114, except for a master throttling vane 112a, which is mounted to an actuator shaft 116 that is, in turn, connected to a stepping motor 118. The stepping motor 118 forms a part of the vane control unit 34. Each of the shafts 114, 116 is mounted in the collar via bushings 120. Also, each shaft has attached thereto an annular gear 122 that engages an adjacent idler gear 124. The arrangement is such that when the stepping motor 118 of the vane control unit 34 rotates the actuator shaft 116, not only will the master vane 112 rotate, but all of the throttling vanes 112 will rotate in the same direction.

Under normal operation, the throttling vanes 112 are rotated to a position that causes them to present a minimum profile to the input air flow from the filter 22 (FIGS. 1 and 2) to the turbocharger 14. When control is needed, signaling from the processor 50 to the stepping motor 118 will cause the throttling vanes 112 to rotate, in steps, to present greater profiles to the incoming air flow. It should be evident to those skilled in this art that reducing the amount of air available to the turbocharger will also reduce the available combustion air for the engine 12. Thus, for example, when a situation arises that necessitates the control function, such as when an uncontrollable fire has ignited in the exhaust manifold 16, control can be established by signaling the stepping motor 118, commanding it to rotate the throttling vanes 112 toward their closed position. As airflow to and through the turbocharger 14 is reduced, the combustion air to the engine is also reduced, throttling back engine operation. In the event the situation is beyond control, the throttling vanes 112 can be rotated to their fully closed positions to terminate communication of any air to the diesel engine 12. Started of combustion air, the diesel engine will cease operation.

FIG. 7 illustrates the functions performed by the processor 50 to monitor and read the clutch and impeller probes 56, 64, the bearing probes 56, 60, and the oil pressure probe 64. The other probes are read, and acted upon, in the same manner as indicated in FIG. 7. However, only a few of the probe monitorings are shown and discussed for reasons of clarity.

Turning now to FIG. 7, there is illustrated a flow chart diagram, showing generally certain of the steps used by the processor 50 to perform its scanning and sampling functions. From an initial starting state 110, the processor 50, when first actuated, moves to an initialization state 112 during which it sets the various parameters to be used during its monitoring function. For example, various registers (not shown) will be loaded with the predetermined limits for various of the monitored operating parameters of the system 10 (FIG. 1) such as the maximum allowable pressure of the intake manifold 20, the exhaust temperature as sensed in the exhaust manifold 16, the RPM of the turbocharger 14 (i.e., the turbine/compressor combination), etc.

After the initialization step 112, the state of the processor 50 moves to step 114 during which the pulses produced by the impeller probe 62 (FIGS. 2 and 5) are sampled. They are first compared to a value indicative of a limit of 12,000 RPM. If the sampled value is equal to or greater than 12,000 RPM, the processor unit, at step 116, samples the clutch probe 56 (FIGS. 2 and 3) to determine if the clutch is disengaged. If not, an alarm, either in the form of a specific one of the lights 33, or the audio alarm 40, is actuated at step 118. No alarm is sounded if the clutch probe 56 indicates that the clutch ring 76 is rotating (further indicating disengagement).

Next, at step 120, the sampled RPM of the impeller probe 62 is checked to determine if the RPM of the rotor assembly R (FIG. 1) requires the processor 50 to exercise control. At step 122, if the rotor assembly is running between 20,000 and 24,000 RPM (a rotational velocity that depends upon system design) the processor 50 will begin exercising control at step 124 by signaling the motor control unit 34 (FIGS. 1 and 2) to begin closing the guide vanes 112 (FIG. 6). At the same time, the RPM of the rotor assembly R is checked to see if it equals or exceeds a critical limit of 24,000 RPM at step 122. If so, alarms (either in the form of lights 33 or the audio alarm 40) are actuated at step 126. At 20,000 RPM control is attempted at step 124 by stepping the guide vanes closed. If the RPM of the turbocharger 14 continues until it reaches 26,000 RPM, the processor 50 assumes that control cannot be effected, and moves to step 150 to initiate a SHUTDOWN procedure before terminating operation.

The SHUTDOWN procedure involves sequentially reading all monitored parameters (e.g., intake manifold pressures, exhaust temperatures, clutch probe information, etc.) and storing those readings in non-volatile memory (not shown). Then, the processor 50 will operate the vane control unit 34 to close the guide vanes 112 totally, thereby starving the system 10 of its source of combustion air. Thereby, the processor 50 acted to terminate operation of the system before the turbocharger can destroy itself, saving an expensive piece of machinery for repair and later reuse.

The information stored during the SHUTDOWN step 150 can then be later analyzed to determine what caused the shutdown.

Assuming that the RPM of the turbocharger 14 is within limits, and the clutch probe has been disengaged, the processor 50 will move to step 130 to check bearing wear. Here, the bearing probes 58 and 60 are sampled separately. If either one indicates a movement in their respective longitudinal orientations equal to or greater than 2 Mils, an alarm will be actuated at step 132 to signify that bearing wear has reached a point of significance. If, however, movement is greater than 3 Mils, the system is shut down at step 134, going through the same process as that described above with respect to step 150.

If the RPM and bearing movement checks of steps 114 and 130 are passed with no problem (or only alarms are sounded, without any control function), the processor 50 moves to step 136, where it reads the pressure probe 64 (FIG. 2) to determine oil pressure. If the oil pressure is less than 6 PSI, an alarm is sounded, step 138, and the procedure returned to continue through the RPM bearing movement, and oil pressure checks once again. If the oil pressure checks good, the procedure also returns to the RPM check 114.

The remaining sensors are read, in seriaturn, at steps 142, 144, 146 and 148 in basically the same fashion, and each reading compared to a limit for that particular reading. If the monitored operating parameters are within the ranges set by the limit for those parameters, the processor 50 will continuously cycle through the steps 114–148 of FIG. 7.

In summary, there has been disclosed a system capable of protecting a costly invention. In addition, it will be noted that a substantial amount of fault-tolerance has been built into the system to detect overspeeding — the most destructive and costly type of failure encountered in diesel engine systems; a failure that can result in near total, if not total, destruction of the turbocharger. Overspeeding is most often caused by excessive heat energy in the exhaust system which can raise the RPM of the rotor assembly to destructive levels.

Among the usual sources of excessive heat energy in the exhaust system are fires in the intake or exhaust manifolds of the diesel engine; thus, the reason for the temperature sensors, which act as backup for the RPM measured by the impeller probe 62. In addition, overspeeding will also manifest itself in a supernormal pressure of the combustion air or exhaust gases in the intake and/or exhaust manifolds 20, 16, respectively; hence, the pressure sensors.

I CLAIM:

1. In a large bore diesel engine system of the type including a compression engine coupled to an exhaust-driven turbo-charger that operates to supply compressed air to the compression engine, apparatus for monitoring certain of the operating conditions of the system to provide a warning if one or more of the operating conditions reach a predetermined limit corresponding to certain of the operating conditions, the monitoring apparatus comprising for each of the certain operating conditions:

the turbocharger including a rotatable shaft coupled to the diesel engine by an overriding clutch assembly operable to disengage a drive connection between the rotatable shaft of the turbocharger and the diesel engine when the rotatable shaft has obtained a predetermined rotational speed;

first sensor means, operably coupled to the system, for providing a first signal indicative of the operating conditions being monitored;

second and third sensor means respectively mounted for sensing the rotational speed of the rotatable shaft, and an engagement of the overriding clutch to provide second and third signals, respectively, indicative of the rotational speed and clutch engagement;

processor means, coupled to the sensor means, for receiving and comparing each signal with a respective warning level and to issue a warning signal when the comparison between a signal and its respective warning level indicates that a predetermined limit has been reached or exceeded; and warning means, coupled to the processor means and responsive to the warning signal, for warning a user, the warning means including means for displaying a warning.

2. The monitoring apparatus of claim 1, wherein the processor means is coupled to receive the second and third signals, and is operable to issue the warning signal when the rotational speed of the rotatable shaft has achieved or exceeded the predetermined rotational speed and the overriding clutch remains engaged.

3. In a large bore diesel engine system of the type including a compression engine coupled to an exhaust-driven turbocharger that operates to supply compressed air to the compression engine, the turbocharger having a rotatable shaft connected to the diesel engine by a drive connection that includes an overriding clutch assembly operable to disengage the drive connection between the rotatable shaft and the diesel engine when the rotatable shaft has obtained a predetermined rotational speed, apparatus for monitoring the rotational speed of the rotatable shaft and engagement of the drive connection to provide therefrom a warning of the rotational shaft reaching a predetermined rotational speed with the drive connection engaged, the monitoring apparatus comprising:

first sensor means operably coupled to the system for providing a first signal indicative of the rotational speed of the rotatable shaft;

second sensor means operably coupled to the overriding clutch assembly for providing a second signal indicative of engagement of the drive connection;

processor means coupled to the first and second sensor means to receive and compare the first and second signals with a first and second warning levels, respectively, and to issue a warning signal when the first signal is equal to or greater than the first warning level or when the second signal is equal to or greater than the second warning level; and warning means, including display means, coupled to receive the warning signal from the processor means to provide the warning.

4. Apparatus for gathering and storing data concerning operating conditions of a large bore diesel engine system of the type including a compression engine and an exhaust-driven turbocharger coupled to one another by connecting means that includes an over-riding clutch assembly operable to disengage a drive connection between a rotatable shaft of the turbocharger and the diesel engine when the rotatable shaft has obtained a predetermined rotational speed, the turbocharger being of the type that operates in response to receipt of exhaust gases communicated thereto from the diesel engine to supply compressed air to the diesel engine, the gathering apparatus comprising:

first sensor means operably coupled to the system to provide a first signal indicative of the rotational speed of the rotatable shaft;

second sensor means operably coupled to the overriding clutch for producing a second signal indicative of disengagement of the clutch;

third sensor means coupled to the turbocharger for sensing vibration of the rotatable shaft to provide therefrom a third signal indicative of such vibration;

processor means, including memory means, coupled to each of the first, second, and third sensor means to periodically sample and store the first, second and third signals in the memory means, each of the samples of the first, second and third signals being stored in the memory means by the processor means with a time stamp identifying the time of storage of such sample.

5. The data gathering system of claim 4, wherein the diesel engine includes an exhaust manifold for communicating the exhaust gases to the turbocharger, and the turbocharger includes exhaust input means for receiving the exhaust gases from the exhaust manifold, and including means for sensing a temperature of the exhaust gases in the exhaust manifold and in the input means to respectively provide first and second exhaust temperature signals therefrom; and the processor means being further operable to periodically sample and store the first and second exhaust temperature signals in the memory means, each of the samples of the first and second exhaust temperature signals being stored in the memory means by the processor means with a time stamp identifying the time of storage of such sample.

6. The data gathering system of claim 4, wherein the diesel engine system includes means for communicating the compressed air from the turbocharger to the diesel engine, the communicating means including a first portion forming a part of the turbocharger, and a second part forming a part of the diesel engine, and including means for sensing a temperature of the compressed air respectively in the first portion and second portion, providing therefrom first and second air temperature signals indicative of the respective temperatures of the compressed air; and the processor means being further operable to periodically sample and store the first and second air temperature signals in the memory means, each of the samples of the first and second air temperature signals being stored in the memory means by the processor means with a time stamp identifying the time of storage of such sample.

7. The data gathering system of claim 4, wherein the turbocharger includes air intake means for receiving ambient air for compression, and air output means for communicating the compressed air to the diesel engine, and including fourth sensor means for sensing a temperature and pressure of air at the air intake means, and a fifth sensor means for sensing a temperature and pressure at the air output means to provide therefrom fourth and fifth signals respectively of (1) the temperature and pressure at the intake means and (2) the temperature and pressure at the air output means; and the processor means being further operable to periodically sample and store the fourth and fifth signals in the memory means, each of the samples of the fourth and fifth signals being stored in the memory means by the processor means with a time stamp identifying the time of storage of such sample.

8. The data gathering system of claim 7, wherein the diesel engine includes compressed air receiving means coupled to the air output means of the turbocharger for receiving the compressed air, and including sixth sensor means for sensing a temperature and pressure of the compressed air at the air receiving means to provide therefrom a sixth signal indicative of the temperature and pressure of the compressed air; and the processor means being further operable to periodically sample and store the sixth signal in the memory means, each sample of the sixth signal being stored in the memory means by the processor means with a time stamp identifying the time of storage of such sample.

9. The data gathering means of claim 4, wherein the rotatable shaft is mounted for rotation in a bearing assembly, and wherein the third sensor means includes at least first proximity sensing means mounted in the bearing assembly for sensing vibration of the rotatable shaft to provide therefrom a first proximity signal indicative of vibration of the rotatable shaft; and the processor means being further operable to periodically sample and store the first proximity signals in the memory means, each of the samples of the first proximity signals being stored in the memory means by the processor means with a time stamp identifying the time of storage of such sample.

10. In a large bore diesel engine system of the type including a compression engine coupled to an exhaust-driven turbo-charger that operates to supply compressed air to the compression engine, apparatus for monitoring certain of the operating conditions of the system to provide a warning if one or more of the operating conditions reach a predetermined limit corresponding to the certain of the operating conditions, the monitoring apparatus comprising for each of the certain operating conditions:
an overriding clutch, included as part of the coupling between the compression engine and the turbocharger, the clutch coupled to a rotatable shaft of the turbocharger and operable to disengage the compression engine from the turbocharger;
first sensor means, operably coupled to the rotatable shaft and responsive to a rotational speed of the rotatable shaft, for providing a speed signal;
second sensor means, operably coupled to the overriding clutch, for producing a second signal indicative of disengagement of the clutch;
processor means, coupled to the first and second sensor means, for receiving and comparing the speed signal with a first warning level and for issuing a warning signal when the comparison of the speed signal and the first warning first signal indicates that a predetermined limit has been equaled or exceeded and the second signal indicates that the clutch is disengaged; and
warning means, coupled to the processor means and responsive to the warning signal, for warning a user, the warning means including means for displaying a warning.

11. In a large bore diesel engine system for the type including a compression engine coupled to an exhaust-driven turbo-charger that operates to supply compressed air to the compression engine, apparatus for monitoring certain of the operating conditions of the system to provide a warning if one or more of the operating conditions reach a predetermined limit corresponding to the certain of the operating conditions, the monitoring apparatus comprising for each of the certain operating conditions:
first sensor means, operably coupled to the system, for providing a first signal indicative of the operating conditions being monitored;
processor means, coupled to the sensor means, for receiving and comparing the first signal with a first warning level and to issue a warning signal when the first signal is equal to or greater than the first warning level;
communicating means, which communicate exhaust gases from the compression engine to the turbocharger, for driving the turbocharger, the communicating means responsive to a control means, coupled to the processor means, for receiving a control signal and for controlling the communication of exhaust gases to the turbocharger; and
warning means, coupled to the processor means and responsive to the warning signal, for warning a user, the warning means including means for displaying a warning.

12. The monitoring apparatus of claim 11, the processor means being operable to assert the control signal when the first signal is equal to or greater than the first warning level.

13. The monitoring apparatus of claim 12, the processor means being operable to compare the first signal with a second warning level and to issue a further control signal when the first signal is equal to or greater than the second warning level; the control means being coupled to receive the second control signal and operable to substantially terminate communication of the exhaust gases from the compression engine to the turbocharger.

14. The monitoring apparatus of claim 13, wherein the control means includes a plurality of movable vanes situated to present a first profile to the exhaust gases communicated from the compression engine to the turbocharger when the control signal is not asserted.

15. The monitoring apparatus of claim 14, the control means including means coupled to the plurality of movable vanes to reposition the movable vanes to a plurality of second profiles to impede communication of the exhaust gases from the compression engine to the turbocharger when the control signal is asserted.

16. The monitoring apparatus of claim 15, the control means being operable in response to assertion of the second control signal to move the vanes to a profile substantially terminating communication of the exhaust gases from the compression engine to the turbocharger.

17. In a large bore diesel engine system of the type including a compression engine coupled to an exhaust-driven turbocharger by means that communicates exhaust gases from an exhaust manifold of the compression engine to an exhaust gas intake of the turbocharger and compressed air from a compressed air output of the turbocharger to a compressed air intake of the compression engine, the turbocharger having a rotatable shaft coupled to the compression engine by means including an overriding clutch assembly operable to disengage a drive connection between the rotatable shaft of the turbocharger and the diesel engine when the rotatable shaft has obtained a predetermined rotational speed, apparatus for monitoring a plurality of the operating conditions of the system, the monitoring apparatus comprising:

sensor means coupled to the system for sensing and providing operating condition signals indicative of:
(a) a temperature and pressure at the exhaust manifold of the compression engine,
(b) a temperature and pressure at the exhaust gas intake of the turbocharger,
(c) a temperature and pressure at the compressed air output of the turbocharger,
(d) a temperature and pressure at the air intake of the compression engine,
(e) vibration of the rotatable shaft,
(f) rotational speed of the rotatable shaft, and
(g) disengagement of the overriding clutch assembly;
processor means, including memory means, coupled to sensor means to periodically sample and store the operating condition signals in the memory means, each of the stored samples having associated therewith in the memory means by the processor means with a time stamp identifying the time of storage of each such sample.

18. The monitoring apparatus of claim 17, wherein the rotatable shaft is mounted for rotation in a bearing means, the sensor means includes first and second proximity sensing means for sensing vibration of the rotatable shaft in substantially a first and a second plane, respectively.

19. The monitoring means of claim 18, wherein the first plane is substantially horizontal.

20. The monitoring means of claim 19, wherein the second plane is substantially vertical.

21. A method for monitoring a certain one of a plurality of operating conditions of a large bore diesel engine system of the type including a compression engine coupled to an exhaust-driven turbocharger that operates to supply compressed air to the compression engine, to provide a warning if one or more of the operating conditions reach a predetermined limit corresponding to the certain one of the plurality of operating conditions, the monitoring method comprising the steps of:
providing a speed signal indicative of a rotational speed of a rotatable shaft of the turbocharger coupled to the compression engine by an overriding clutch;
providing an engagement signal indicative of an engagement of the overriding clutch;
receiving and comparing the speed and the engagement signals respectively with a first and a second warning level;
issuing a warning signal when the comparison of the first and second signals with the respective warning levels is indicative that a predetermined limit has been equaled or exceeded; and
warning a user in response to the warning signal.

22. The monitoring method of claim 21 wherein said issuing step further comprises issuing the warning signal when the rotational speed of the rotatable shaft has achieved or exceeded a predetermined rotational speed and the overriding clutch remains engaged.

23. The monitoring method of claim 21 wherein said provided overriding clutch is operable to disengage the compression engine from the turbocharger and wherein said issuing step issues the warning when the rotational speed of the turbocharger has reached a predetermined limit and the clutch is engaged with the compression engine.

24. The monitoring method of claim 21 wherein the warning signal issues upon the comparison indicating that all the signals equal or exceed their respective predetermined limits.

25. The monitoring method of claim 21 wherein the warning signal issues upon the comparison indicating that any one of the signals equal or exceed their respective predetermined limits.

26. The monitoring method of claim 21 further comprising the step of:
periodically sampling and storing the speed signal and the engagement signal in a memory means with a time stamp identifying a time of sampling the signals.

27. The monitoring method of claim 26 further comprising the steps of:
providing a means for communicating exhaust gases from the compression engine to drive the turbocharger which is responsive to a means for controlling the communicating means; and
controlling the communication means in response to the comparison indicating that a predetermined value has been equalled or exceeded.

28. The monitoring method of claim 27 wherein the controlling step further comprises substantially terminating the communication of the exhaust gases when the predetermined value has been exceeded.

29. The monitoring method of claim 21 further comprising the steps of:
providing a vibration signal indicative of a vibration of the rotatable shaft of the turbocharger;
periodically sampling and storing the speed signal, the engagement signal and the vibration signal in a memory means with a time stamp identifying a time of sampling the signals.

30. The monitoring method of claim 21 further comprising the steps of:
providing a means for communicating exhaust gases from the compression engine to drive the turbocharger which is responsive to a means for controlling the communicating means; and
controlling the communication means in response to the comparison indicating that a predetermined value has been equalled or exceeded.

31. The monitoring method of claim 30 wherein the controlling step further comprises substantially terminating the communication of the exhaust gases when the predetermined value has been exceeded.

* * * * *